United States Patent [19]

Garner

[11] Patent Number: 5,680,688

[45] Date of Patent: Oct. 28, 1997

[54] PORTABLE APPARATUS FOR AFFIXING A LACER TO A BELT

[76] Inventor: James Melvin Garner, 4912 SE. 3rd Ave., Durant, Okla. 74701

[21] Appl. No.: 602,100

[22] Filed: Feb. 15, 1996

[51] Int. Cl.⁶ .............................. B23P 11/00; B23P 19/02
[52] U.S. Cl. ............................ 29/243.51; 29/252
[58] Field of Search .......................... 474/31, 255, 256; 29/243.51, 564.8, 252

[56] References Cited

U.S. PATENT DOCUMENTS

| | | |
|---|---|---|
| D. 328,749 | 8/1992 | Womack . |
| 1,740,180 | 12/1929 | Larson . |
| 1,853,928 | 4/1932 | Purple . |
| 2,899,680 | 8/1959 | Potter . |
| 2,908,008 | 10/1959 | Potter . |
| 3,044,074 | 7/1962 | Tebb et al. . |
| 4,517,737 | 5/1985 | Sulzle ............................. 29/798 |
| 5,018,262 | 5/1991 | Wheatcraft ..................... 29/243.51 |
| 5,020,209 | 6/1991 | Fullard ........................... 29/564.8 |
| 5,415,913 | 5/1995 | Clevenger, Jr. ................. 428/58 |

*Primary Examiner*—Tamara L. Graysay
*Assistant Examiner*—Tony Boyd
*Attorney, Agent, or Firm*—Head, Johnson & Kachigian

[57] ABSTRACT

A portable apparatus is provided for affixing a lacer assembly to one end of a belt. A lacer assembly is in the form of a plurality of paralleled metal lacing hooks each having a pin receiving loop, the lacing hooks each having opposed sharpened ends that are spaced to receive the end of a belt therebetween. The apparatus has a base that supports a backup anvil and moveable anvil that receives a lacer attached therebetween. The lacer attachment includes an elongated bolt extendable through the loop of each of the lacer hooks by which a lacer assembly is temporarily retained. A manually operatable jack is supported to the base and has a moveable portion that engages the moveable anvil. When one end of a belt is positioned between the sharpened ends of the lacer hooks positioned in the lacer attachment the jack can be actuated to force the lacer attachment jaws towards each other to deform the lacer hooks to attach them to the belt.

36 Claims, 11 Drawing Sheets

Fig. 18

# PORTABLE APPARATUS FOR AFFIXING A LACER TO A BELT

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

Many kinds of equipment use belts for rotating pieces of equipment or for the movement of materials. While the present invention is not so limited, a primary application of the invention is for use in repairing belts on farm equipment and, particularly, for repairing belts used on hay balers. A common type of hay baler in use today in the United States and other countries of the world produces large, round bales. These type of hay balers use a number of paralleled spaced apart belts onto which hay is moved and rotated until a large bale is formed. After a bale is formed, it is dumped from the baler and a new bale is started. The typical round hay baler uses from six to eight belts and the belts can vary in width from about 6 to about 12 inches. Obviously, the wider the belts the fewer that are required to produce a bale of a given length.

The belts used on a round hay baler are subject to substantial stress and wear. A problem encountered by farmers or others that use round hay balers is that of repairing a belt when it breaks. If a farmer is operating a round hay baler and a belt breaks, the belt must be repaired before baling of hay can be resumed. If the farmer is required to take the broken belt to a repair shop, substantial delay can be expected since a repair shop may be many miles from the hayfield where the baler is in use at the time the belt breaks. If the farmer has facilities and equipment at his home or base of operation he can take the belt there for repair but even this may occasion substantial delay in that frequently farmers have hay baling operations that are not immediately adjacent to their home or workshop where belt repair facilities may be readily available.

The present invention is intended to overcome the difficulties regarding the repair of belts, and particularly on hay baler belts, and provides a portable apparatus for use in repairing belts. More specifically, the present invention provides a portable apparatus for affixing a lacer assembly to one end of a belt.

Belts, of the type used in hay balers, typically are formed of a long length of flexible material having opposed ends. At each opposed end of the long length of belt a lacer assembly is attached. A lacer assembly is formed of a plurality of paralleled metal lacing hooks each of which has a pin receiving loop. The typical lacing hook is a unitary length of wire that is sharpened on each end and bent in a generally V-shaped configuration with a loop between the opposed ends. The wire of which each hook is formed is bent adjacent the opposed sharpened ends so that the ends extend towards each other. When a lacer assembly made up of a plurality of hooks is attached to the end of a belt, the loops function as a way to secure the ends of the belt together. That is, with a lacer assembly at each end of the belt, the lacer assemblies may be aligned so that the hooks of each of the lacer assemblies interweave with each other. A rod can be extended through the interweaved lacer hook loops to thereby secure the belt end to end.

The present invention provides a portable means of securing a lacer assembly to each end of a belt and provides means for preparing each end of a belt to receive a lacer assembly.

For background information relating to belt lacing machines that are useable for repairing belts, reference may be had to the following United States Patents:

| PATENT NO. | INVENTOR | TITLE |
|---|---|---|
| D328749 | Womack | Belt Lacer |
| 1740180 | Larson | Belt Lacing Machine |
| 1853928 | Purple | Belt Fastener Applying Machine |
| 2899680 | Potter | Belt-Fastening Machines |
| 2908008 | Potter | Belt-Fastening Machines |
| 3044074 | Tebb et al | Belt Lacing Machines |
| 5020209 | Fullard | Belt Lacing and Cutter Assembly |

BRIEF SUMMARY OF THE INVENTION

A portable apparatus for affixing a lacer assembly to a belt includes a base having an upper surface. The base can be conveniently formed of an elongated channel member of the type commonly used in the construction industry. Secured to the base are appliances that enable a user to prepare an end of a belt to receive a lacer assembly and for subsequently attaching the lacer assembly to the prepared belt end.

The base has one side edge that is termed a cutting edge. A first guide member is secured to the base upper surface, the guide member having a guide edge that is perpendicular to the cutting edge. A second guide member is secured to the base upper surface having a guide edge that is spaced paralleled to the first guide member guide edge, the spacing between the guide edges being substantially equal to the width of a belt to be repaired. A length of belt can thereby be positioned between the guide edges to extend over the cutting edge. A short length of the end of a damaged belt can be cut off by using a knife along the cutting edge so that the belt then has an end edge that is perpendicular to the length of the belt.

In a preferred arrangement, the second guide member secured to the base upper surface has a horizontally extending lip that is spaced parallel to and above the belt upper surface. A square similar to a carpenters square is used in the cutting operation. The square has two legs that extend at right angles to each other. One of the legs of the square provides a cutting edge that is used to assist in cutting the end of a belt to be certain that the edge formed by the cutting operation will be perpendicular to the length of the belt. For this purpose, one leg of the square is positioned under the horizontally extending lip of the second guide member so that the cutting edge of the square will then extend perpendicular to the length of the belt.

The base, in the preferred embodiment, also includes an abutment member affixed to an edge of the base, the abutment member being perpendicular to the first and second guide edges. The abutment member has an upper edge spaced at a selected distance above the base upper surface. After a belt has been cut off to provide an edge that is perpendicular to the belt length, the belt may be positioned against the abutment member and a knife, slid along the guide surface of the abutment member, may be used to trim the thickness of the belt to a predetermined thickness selected by the height of the plane of the abutment member guide edge above the base upper surface. This step in the repair of a belt is necessary, or at least highly desirable, when the belt has a textured or patterned embossment on one of the belt surfaces.

The base has a fixed anvil and, spaced from and paralleled to it, a moveable anvil. Positioned between the fixed and moveable anvils is a lacer attachment member that is of generally V-shaped cross-sectional configuration having a first and second jaws that are pivotally attached to each other. The jaws are configured to receive a lacer assembly therebetween. The lacer assembly is made up of a plurality of closely spaced paralleled metal lacing hooks each having a pin receiving loop. The lacing hooks are held with respect to each other by a stiff paper reinforcement. In the repair of a belt, the lacer assembly is positioned within the lacer attachment. To removably retain the lacer assembly in the lacer attachment a small diameter long bolt or pin is positioned within the loops of the lacing hooks. After the lacer assembly is secured within the lacer attachment by means of the bolt or pin extending through the hook loops, the stiff paper that holds the hooks in an assembly can be removed.

Supported to the base is a jack, preferably a manually operated hydraulic jack, having a moveable member extending from it. The jack is supported above and parallel to the base, that is, the moveable member moves in a plane that is parallel to the plane of the base. When the jack is actuated, the moveable member engages and pivots the moveable anvil. When the end of a belt is positioned between the hooks of a lacer assembly and the moveable anvil is moved towards the fixed anvil and the hooks are forced to penetrate and lock onto the belt.

In a preferred arrangement one jaw of the lacer attachment has a slidable indexing tab positioned to engage a small portion of the plurality of hooks in a lacer assembly when the moveable anvil is forced towards the fixed anvil. By moving the indexing tab sequentially upon each actuation of the jack, pressure can be applied by the indexing tab to securely force and lock the lacing hooks to the belt.

The entire apparatus including the mechanism used for preparing the belt to receive a lacer and for affixing a lacer assembly to the prepared end of the belt has a total weight thereof of about 90 pounds or less, that is, the total weight is within the capability of the normal workman to move the apparatus about. In this way, a farmer or other operator of a hay baler or similar equipment, can haul the portable apparatus in a pickup truck or trunk of a car so as to have it readily available to repair a belt on site and to thereby eliminate the loss of time necessary to take a broken belt to a repair shop.

A better and more complete understanding of the invention will be obtained from the following description of the preferred embodiment and the claims, taken in conjunction with the attached drawings.

DESCRIPTION OF THE DRAWINGS

In FIGS. 1 through 6 a lacer assembly and a belt are not shown.

FIG. 9 is taken along the line 9—9 of FIG. 8.

DETAILED DESCRIPTION OF THE PREFERRED EMBODIMENTS

Referring now to the drawings and first to FIGS. 1 through 4, the basic structure making up the portable apparatus for affixing a lacer assembly to a belt is illustrated. The apparatus has a base 10 that can be, as illustrated, in the form of an inverted structural steel channel. The base has an upper surface 12, a first end 14 and a second end 16. Base 10 is supported adjacent end 14 by a first leg 18 which, as illustrated, can be in the form of an inverted channel of structural steel, and by a second similar leg 20.

Affixed to the base adjacent first end 14 is an upstanding backup anvil 22 that is held in a fixed position with respect to the base by means of structural braces 24 and 26. Secured to the opposite ends of backup anvil 22 and to base 10 are end plates 28 and 30. Pivotally supported between end plates 28 and 30 by means of bolt 32 is a moveable anvil 34. Supported uprightly on base surface 12 and spaced from moveable anvil 34 is a stanchion 36 reinforced by brace 38.

Figure 7:
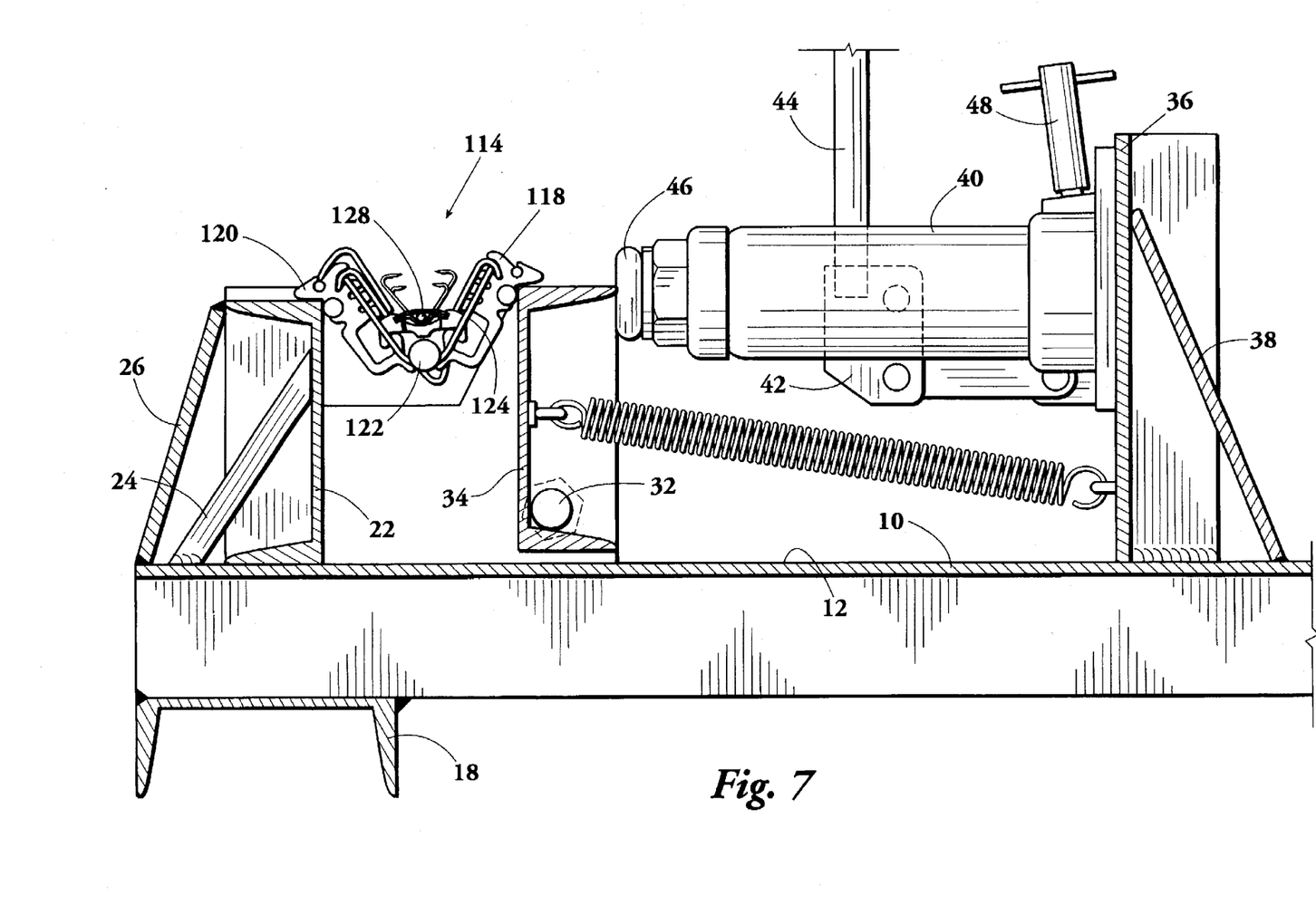
FIG. 7 is a fragmentary enlarged elevational view of the apparatus showing a lacer attachment member positioned between the stationary anvil and moveable anvil.

Positioned between stanchion 36 and moveable anvil 34 is jack 40 having an actuator 42 that receives a removable handle 44 as seen in FIG. 7. Jack 40 has an extendable portion 46. Jack 40 is illustrated as being of the hydraulic type commonly employed for jacking up a wheel of a car or light truck. When actuator portion 42 is pivotally reciprocated, a hydraulic pump within jack 40 pumps fluid to displace a cylinder to which the extendable portion 46 is attached. After the extendable portion has been advanced by manipulation of actuator portion 42, the extendable portion is withdrawn within the jack when hydraulic fluid pressure is relieved by means of valve 48.

The function of the anvils 22 and 34 will be described subsequently.

To maintain moveable anvil 34 in the normally open position and to return jack extendable portion 46 to the collapsed portion when valve 48 is open, a spring 49 is attached between stanchion 36 and moveable anvil 34.

Attached to base 10 is a cutting shelf 50 having an upper surface 52 that is coplanar with base upper surface 12. A gap 54 is maintained between the longitudinal side edge of base 10 and the side edge of cutting shelf 50.

Secured on upper surface 52 of the cutting shelf is a bar 56 that is in the form of a structural steel member of L-shaped cross-sectional configuration. Bar 56 is held at one end with a bolt 58 and at the other end by a hand adjustable bolt 60.

Affixed to base upper surface 12 is an angle member 62 to which is supported a guide member 64 that also is preferably in the formed of an L-shaped structural member. Guide member 64 has slots 66 that receive bolt 68 by which the guide member is attached to angle member 62. Slots 66 and bolts 68 allow the height of the lip portion 70 of the guide member to be adjusted.

Secured to base upper surface 12 and spaced from angle member 62 is a guide bar 72 that may be permanently secured to the base with the space between the guide bar 72 and angle member 62 being the standard maximum width of a belt which the belt splicer is designed to accommodate. For instance, the spacing between angle member 62 and guide bar 72 may be nine inches if the portable apparatus for affixing a lacer to a belt is designed to accommodate a belt of a maximum width of nine inches or obviously, the spacing could be 12 inches or whatever is desired as the maximum accommodateable width.

An adjustable bar 74 is also secured to the upper surface 12 of base 10 and is supported in a selected spacing by means of bolts 76 moving in slots 78 formed in the base. Adjustable bar 74 permits the user of the apparatus to adjust it to the width of the belt for which the apparatus will be most commonly employed. As an example, if a farmer has a hay baler having a plurality of six-inch wide belts, then the spacing between adjustable bar 74 and angle member 62 will be adjusted to accommodate this six-inch spacing. Obviously if the apparatus is designed for use by a farmer or other practitioner that has equipment using other common size belts, the adjustable bar 74 will be so adjusted.

Figure 3:
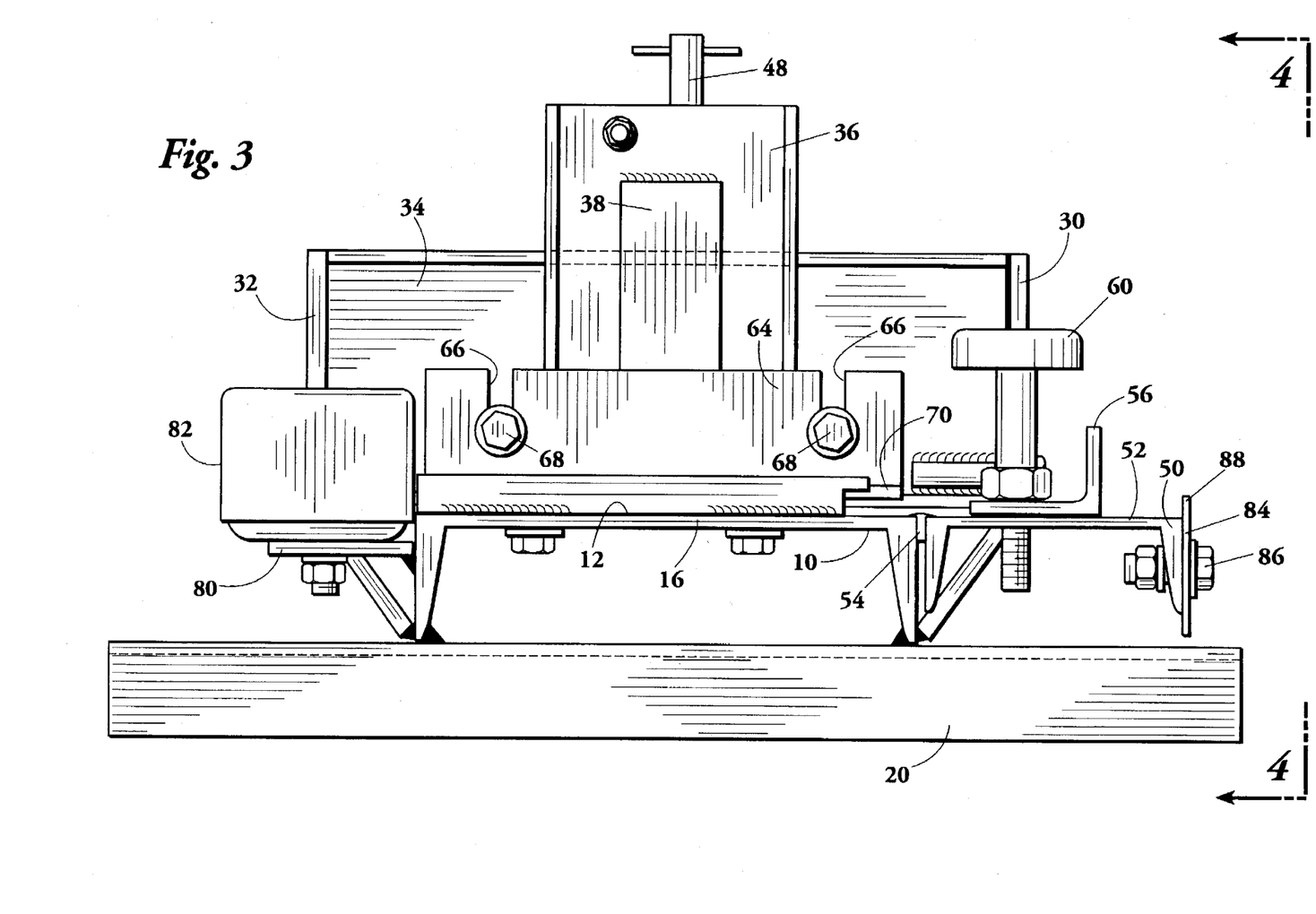
FIG. 3 is an end view, in enlarged scale, of the apparatus as taken along the line 3—3 of FIG. 2.
Figure 4:
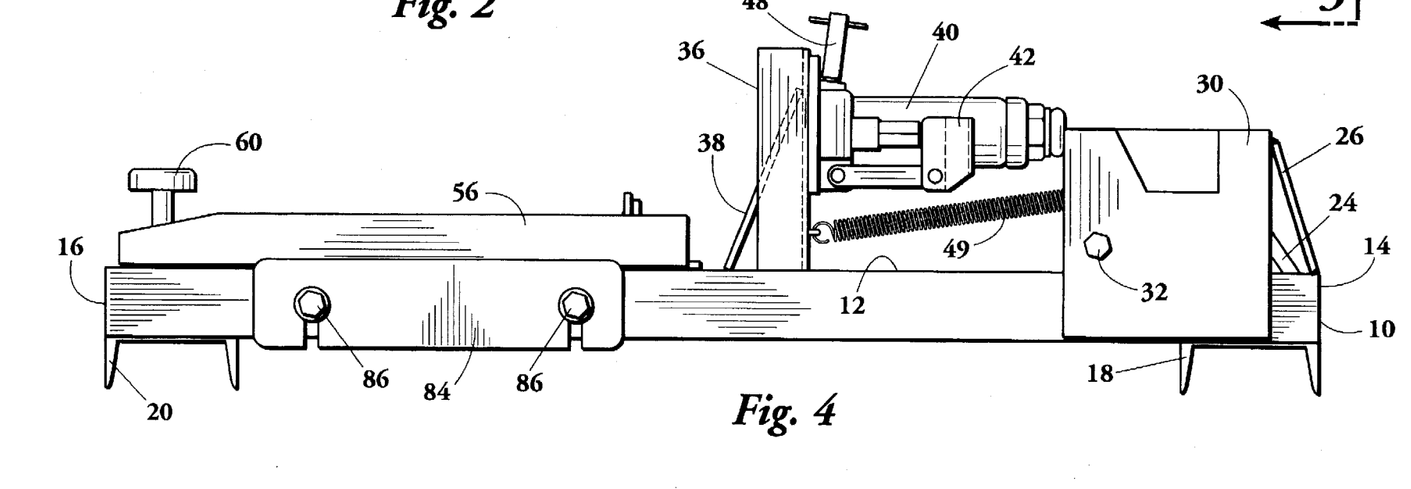
FIG. 4 is an elevational view of the apparatus taken along the line 4—4 of FIG. 3.

As shown best in FIG. 3 there is attached to base 10 a tool box shelf 80 that supports a tool box 82. Tool box 82 is not involved in the operation of the device but is provided for storing tools, such as a knife, as employed in using the apparatus.

Figure 1:
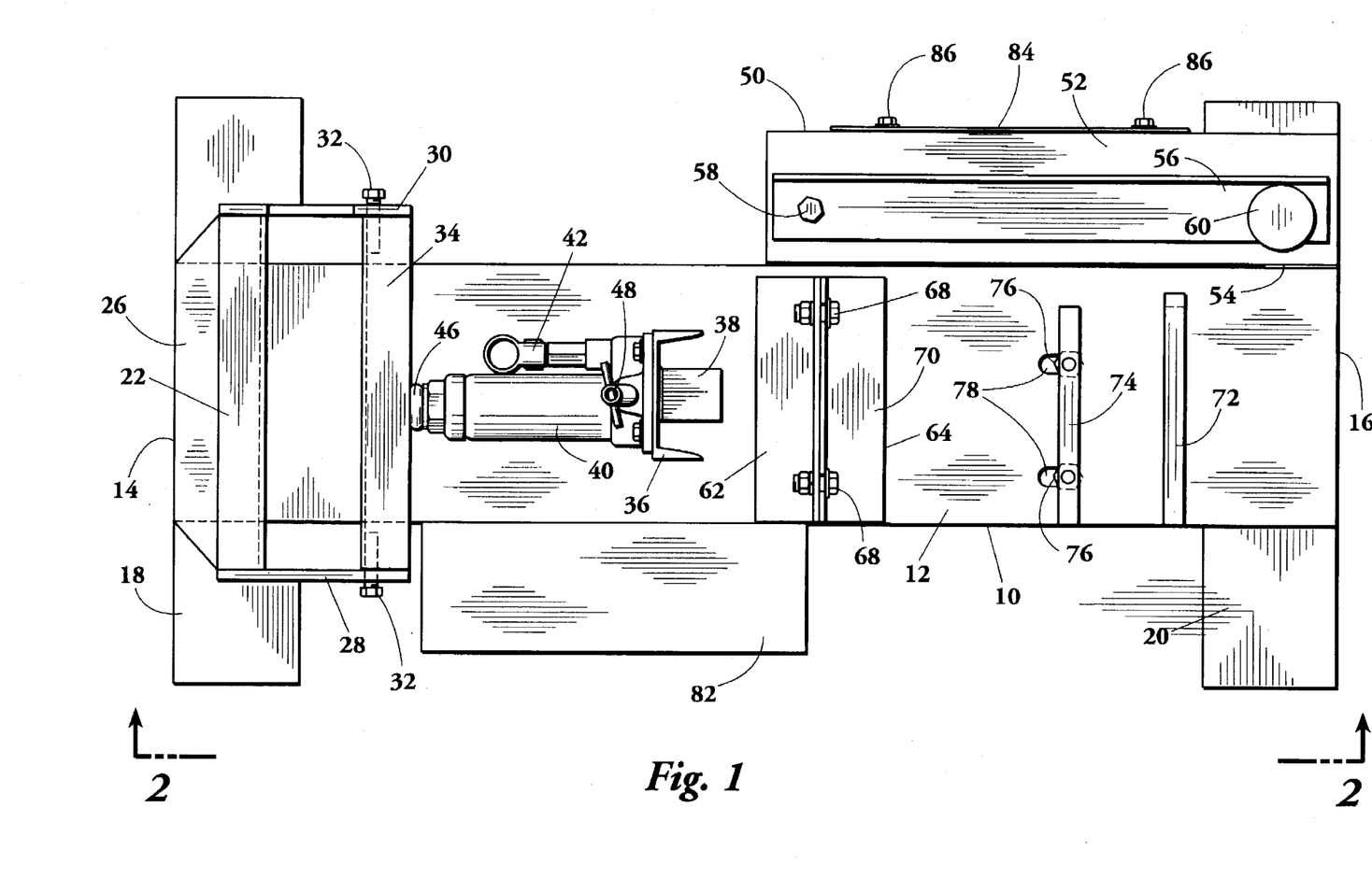
FIG. 1 is a top plan view of a portable apparatus for affixing a lacer assembly to a belt that incorporates the principles of this invention.
Figure 2:
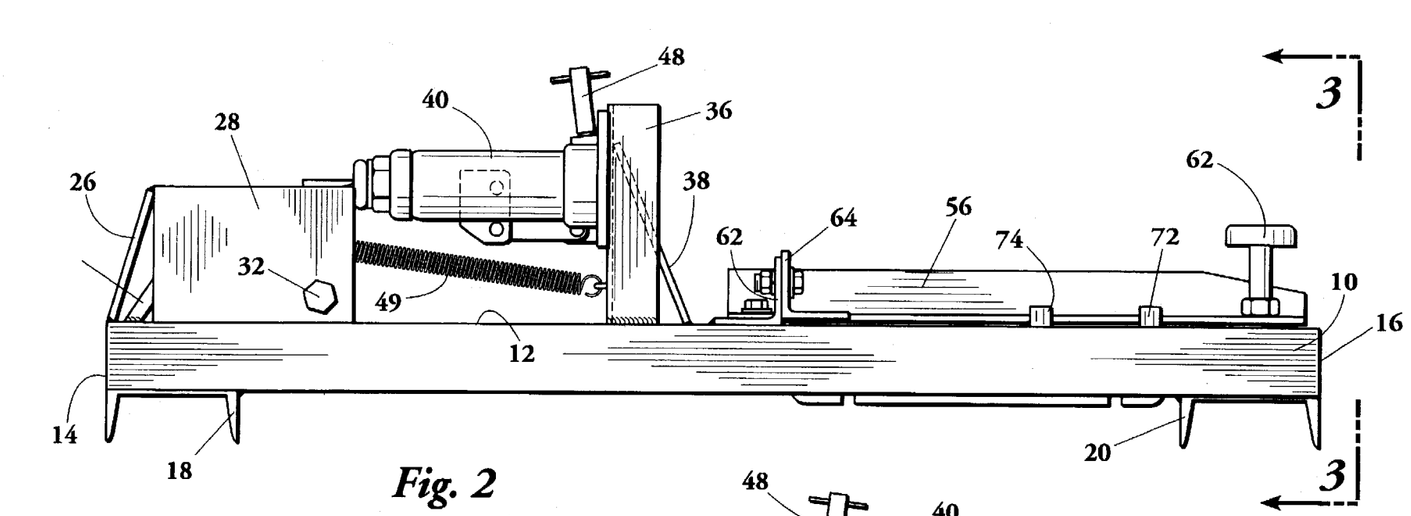
FIG. 2 is an elevational view as taken along the line 2—2 of FIG. 1.

As seen best in FIGS. 1 and 3, there is secured to the outer edge of cutting shelf 50 an abutment member 84 held by means of bolts 86. Abutment member 84 has an upper edge 88, the height of which above cutting shelf upper surface 52 can be adjusted.

Figure 5:
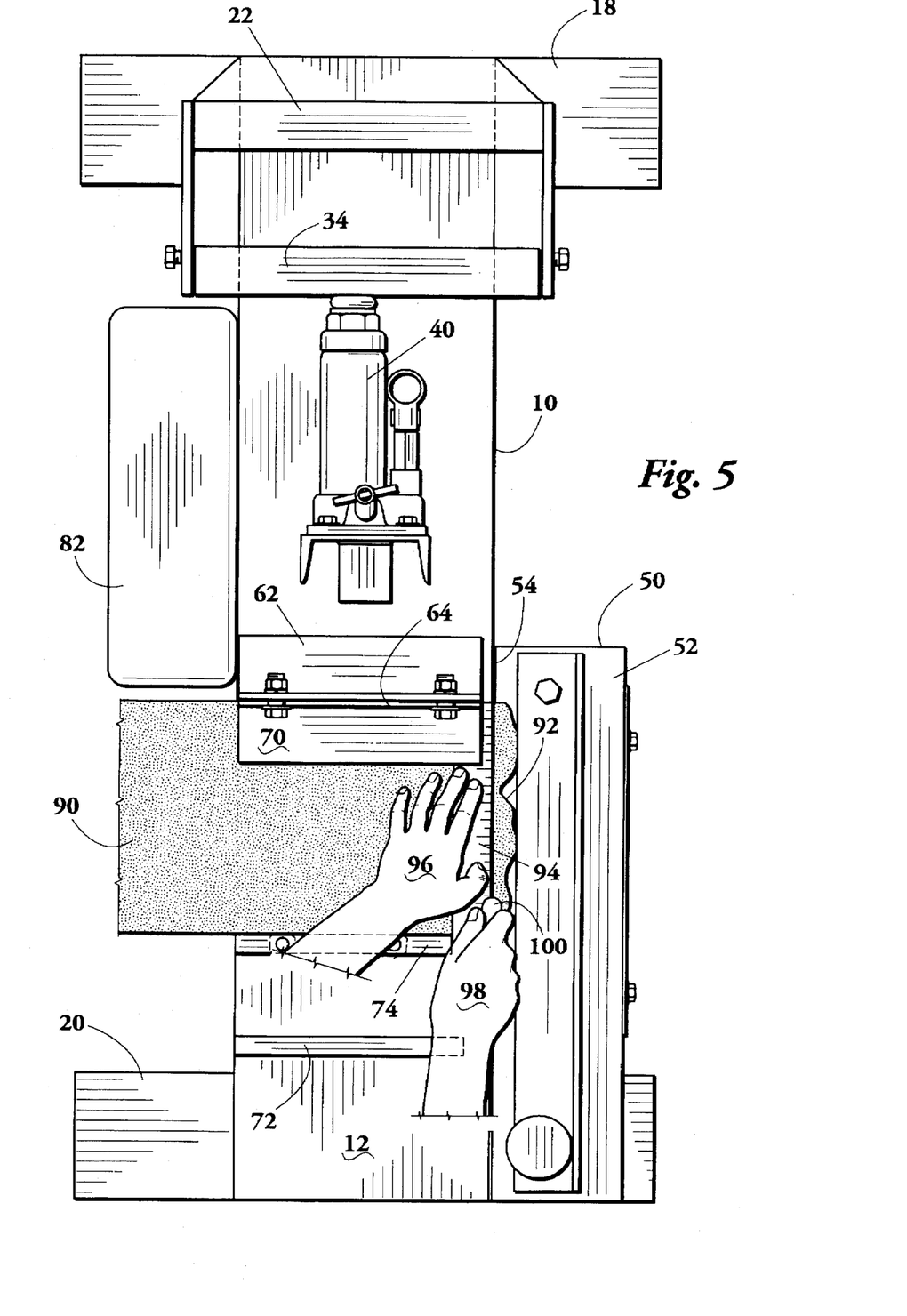
FIG. 5 is a top elevational view as in FIG. 1 but showing the end portion of a belt positioned on the apparatus and showing an operator using a square to form a cutting edge to cut the end of the belt preparatory to installing a lacer assembly.

The first step in splicing a belt is illustrated in FIG. 5 in which the end portion of belt 90 is shown positioned upon the base upper surface. Belt 90 has an irregular end 92 indicative of a belt that has broken. To splice the belt, the irregular end must be removed to provide an end that is perpendicular to the elongated length of the belt. If a new perpendicular end is not provided, a defective splice can result.

To ensure a square end to the belt, it is positioned on base 10, as shown in FIG. 5, with one edge of the belt beneath the lip portion 70 of guide member 64 and the other edge of the belt against adjustable bar 74. The irregular end 92 of the belt is positioned beyond gap 54 provided between base 10 and cutting shelf 50. The hands of workmen are shown in FIG. 5 holding a square 94, one leg being held by the left hand 96 of the user. The other leg (not seen) of square 94 is beneath lip 70 and in engagement with angle member 62 so that the square provides a straight edge coincident with gap 54. The right hand 98 of the user holds a knife 100 having a blade that is slid along the edge of square 94, the blade extending within gap 54, so that the irregular end 92 of belt 90 is removed.

Figure 6:
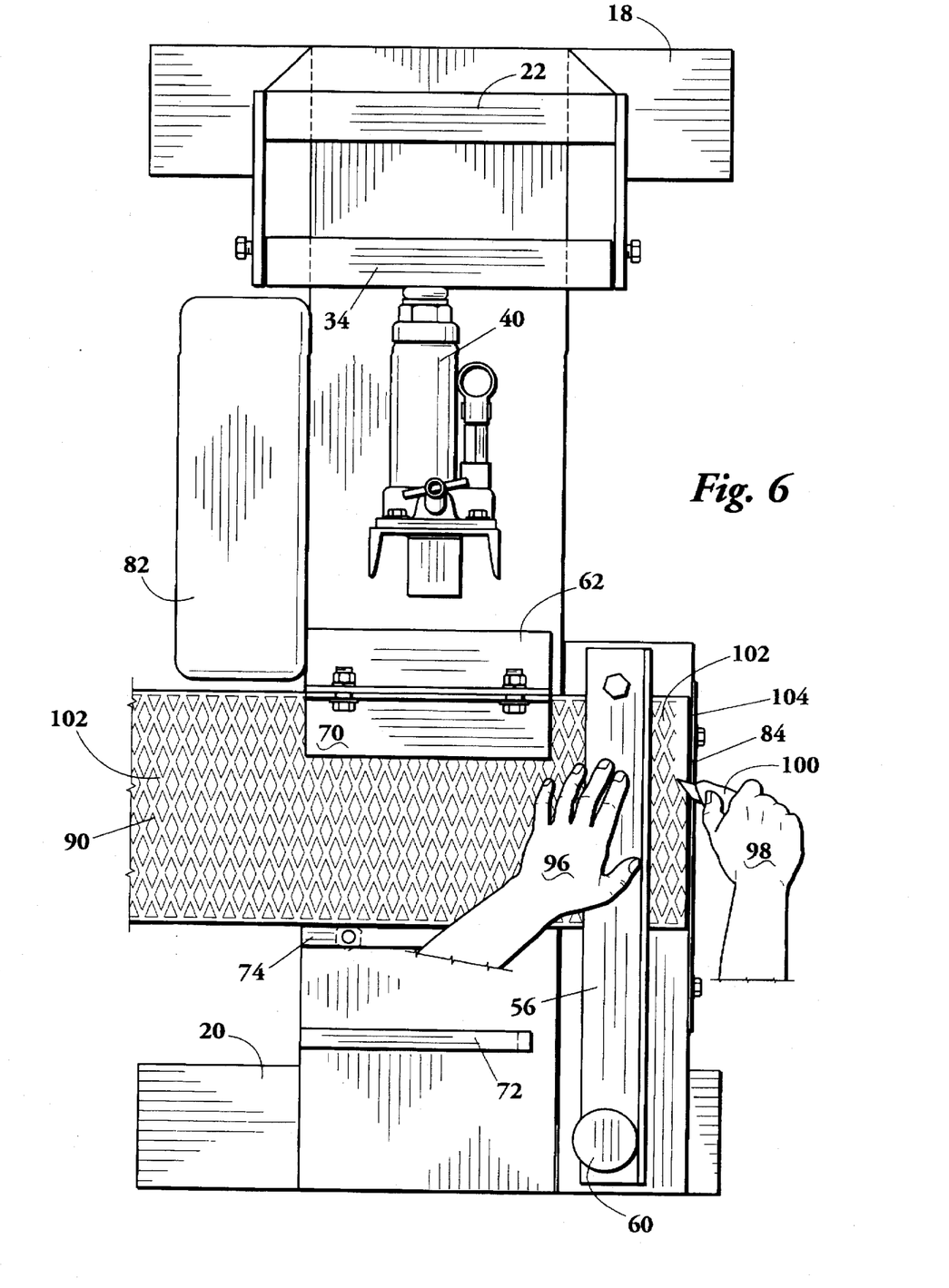
FIG. 6 is a top elevational view of the apparatus as in FIG. 1 but showing the step of trimming the embossed pattern from the belt adjacent the end of a belt preparatory to installing a lacer assembly.

After a new edge has been formed on the belt it is turned over to the view as seen in FIG. 6. Belt 90, as used on agricultural apparatus such as hay balers, typically has a plain surface on one side and an opposite textured surface. The plain surface is seen in FIG. 5 and the textured surface in FIG. 6. The textured surface is formed by a grid of upstanding elastomeric embossments 102. To provide an effective splice of belt 90, embossments 102 are preferably removed from the area of the belt where the splice will be made. This is accomplished as shown in FIG. 6. The end of the belt is positioned beneath bar 56 so that the square end 104 of the belt, formed in the cutting operation as illustrated in FIG. 5, is in contact with abutment member 84. Bar 56 is tightened to hold the belt in position. The user, with knife 100 in his right hand 98, moves the blade along the upper edge 88 of abutment member 84, the blade being held parallel to cutting shelf upper surface 52 to cut off embossments 102. The embossments need to be removed only for a short distance the adjacent square end 104 of the belt in order to provide an effective splice. After the embossments are removed adjacent square end 104, the belt is ready to receive a lacer assembly of the type illustrated in FIGS. 10, 11 and 12.

Figures 10, 11, 12:
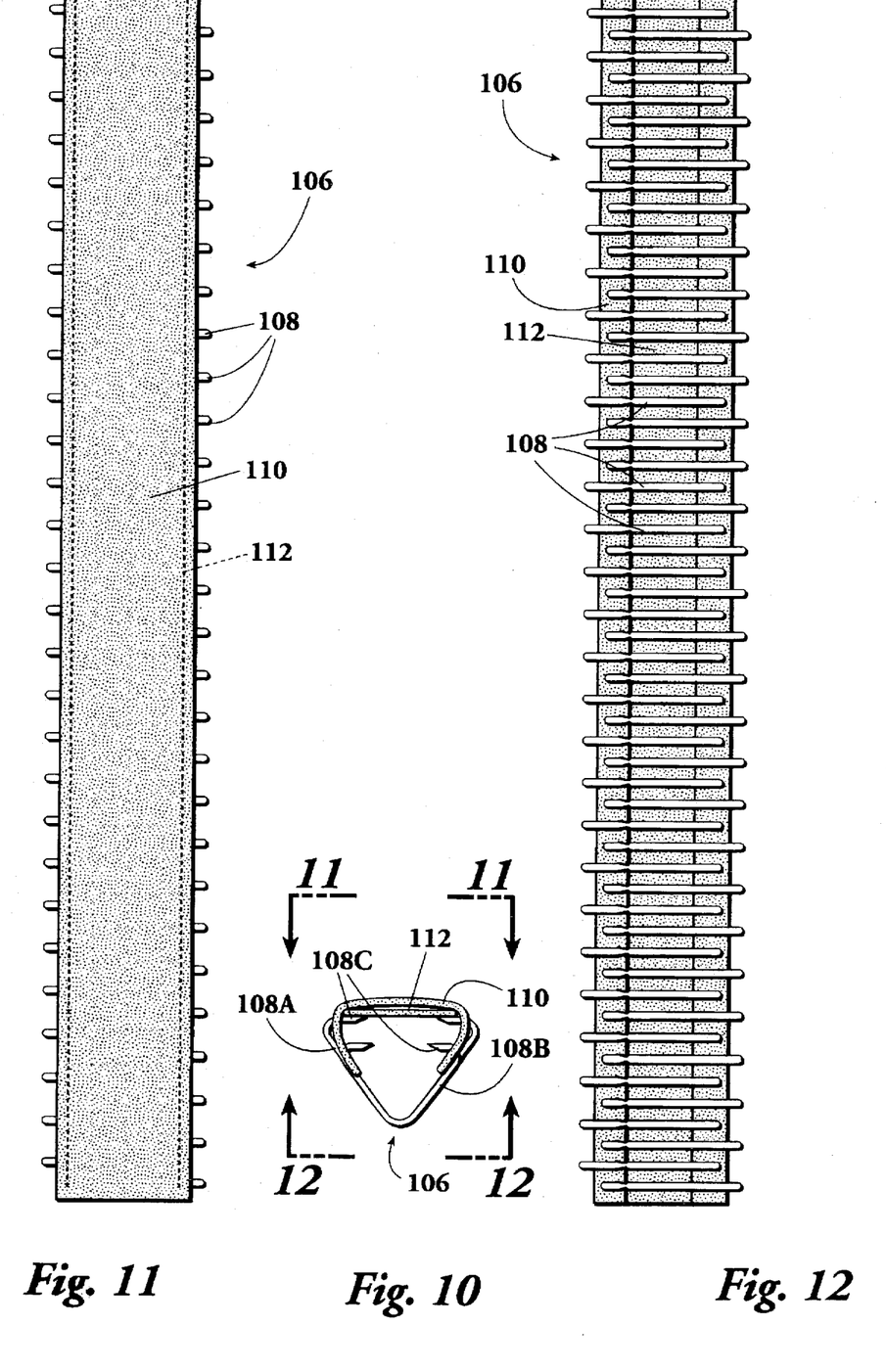
FIG. 10 is an end view of a lacer assembly as commercially supplied for use in splicing a belt.
FIG. 11 is a top view of the lacer assembly, as taken along the line 11—11 of FIG. 10, showing the metal hooks as held in position by a stiff paper.
FIG. 12 is a bottom view, as taken along the line 12—12 of FIG. 10, of the lacer assembly.

A belt lacer assembly is generally indicated by the numeral 106 in FIG. 10, 11 and 12. This is a commercially available product and is an assembly of a plurality of paralleled lacing hooks 108. Each of the lacing hooks is of generally V-shaped construction and has a longer leg 108A as shown in FIG. 10 and shorter leg 108B. The orientation of the shorter and longer legs are reversed on adjacent hooks in the assembly. Each hook has, at the outer end of each leg, an inwardly extending portion 108C that terminates in a sharp point.

Hooks 108 are held in spaced apart relationship in the assembly by a length of stiff paper 110 that is contoured in such a way that the inward portions 108C of each of the hooks extends through the paper. An elongated flat sheet of paper 112 is positioned between the main paper 110 and the inwardly extended portions 108C of each of longer legs 108A of the hooks.

Figure 13:
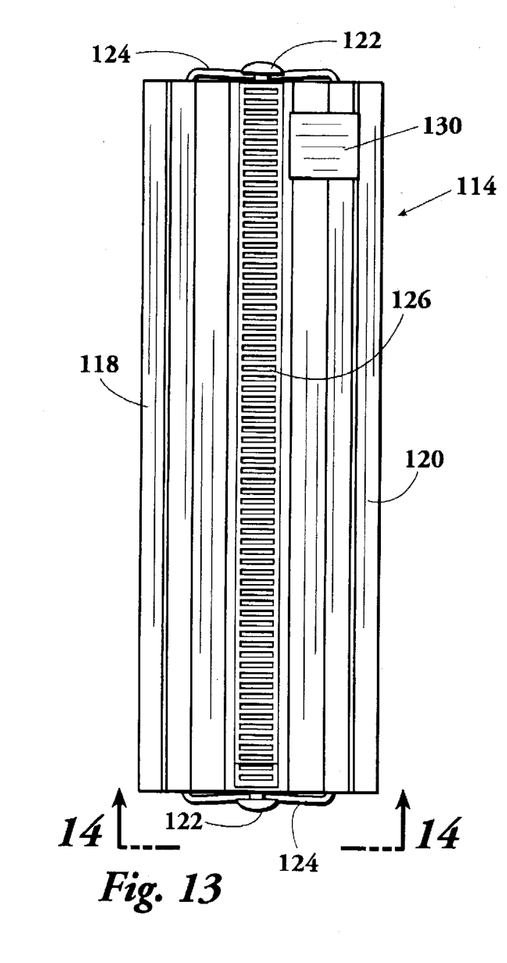
FIG. 13 is a top plan view of a lacer attachment member that is positioned between the stationary and moveable anvils of the apparatus.
Figure 14:
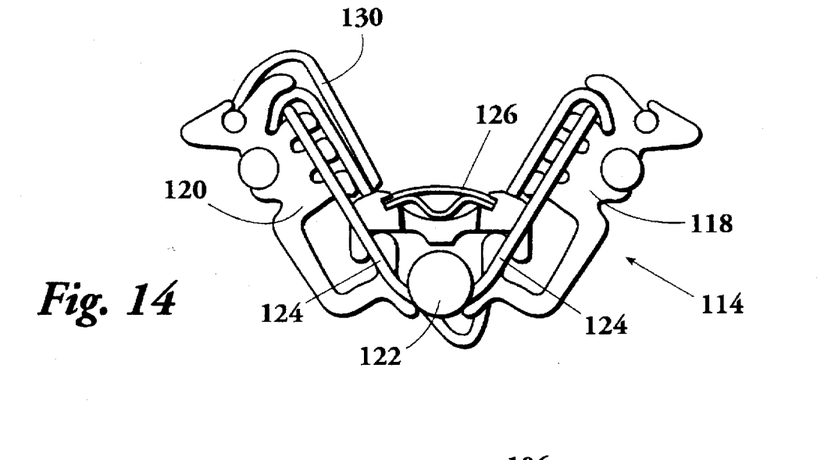
FIG. 14 is an end view of the lacer attachment member, as taken along the line 14—14 of FIG. 13, showing it ready to accept a lacer assembly.

As illustrated in FIG. 7, positioned between backup anvil 22 and moveable anvil 34 is a lacer attachment member generally indicated by the numeral 114. This item is commercially available and the invention herein is not concerned with the construction of lacer attachment member 114 but the invention is concerned with the manner in which the lacer attachment member is employed in a portable apparatus for affixing a lacer assembly to a belt. As shown in FIGS. 13 and 14, lacer attachment member 114 has opposed jaws 118 and 120. The jaws pivot about pin 122 and are retained in the normally open condition by spring 124, spring 124 being of the type that is coiled around pin 122 and has portions extending out to hold jaws 118 and 120 spaced apart from each other. Received between jaws 118 and 120 is a grid 126. Slots in grid 126 are spaced in conformity with the spacing between hooks 108 in a belt lacer assembly 106 as illustrated in FIGS. 10, 11 and 12.

Figure 15:
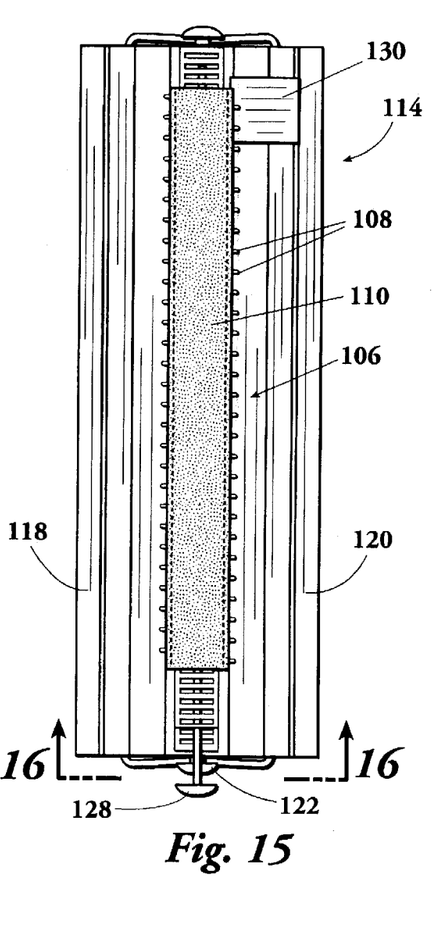
FIG. 15 is a top view of the lacer attachment member showing a lacer assembly with the metal hooks held in position by stiff paper, the assembly being held in position by an elongated pin.
Figure 16:
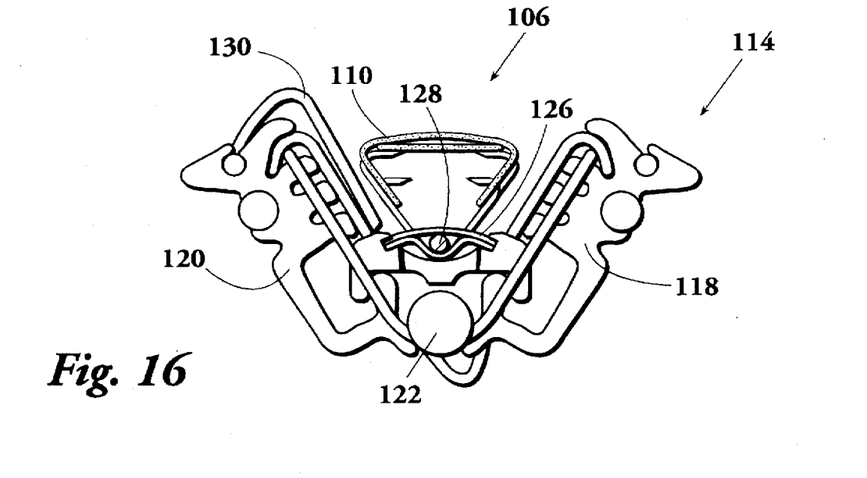
FIG. 16 is an end view, as taken along the line 16—16 of FIG. 15, showing the lacer assembly positioned within the lacer attachment member.

FIGS. 15 and 16 show a belt lacer 106 positioned between jaws 118 and 120 with the V-shaped portions of the hooks received within the slots in grid 126. A pin 128 is inserted under grid 126 and above the V-shaped portion of each of the hooks so that with pin 128 in position, lacer assembly 106 is locked into position between jaws 118 and 120.

Figure 17:
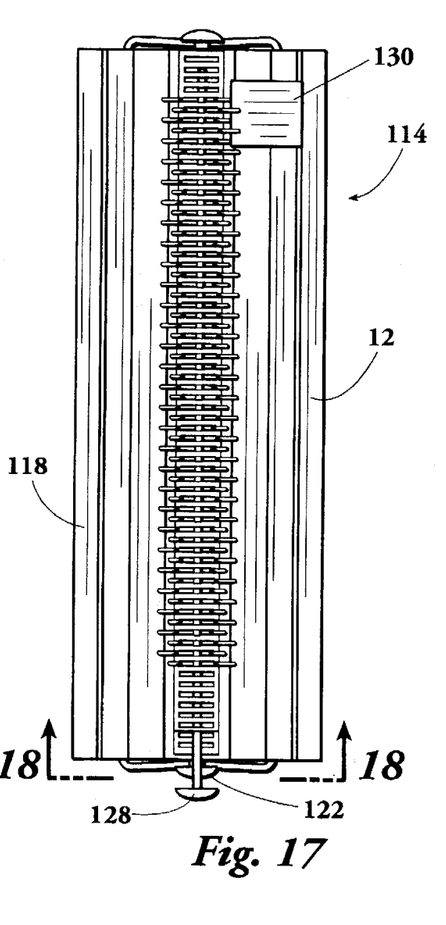
FIG. 17 is a top view of the lacer attachment member with the lacer assembly in position and with the stiff paper removed from the lacer assembly so that the hooks of the lacer assembly are ready to receive a belt.
Figure 18:
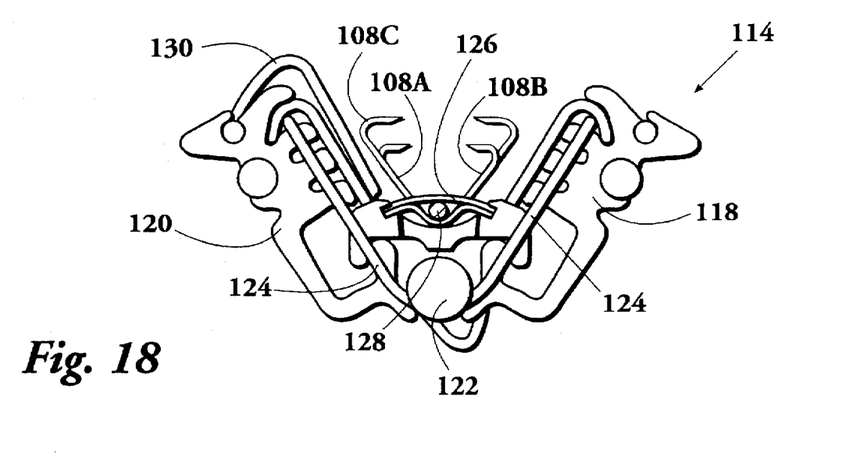
FIG. 18 is an end view, as taken along the line 18—18 of FIG. 17, showing the lacer assembly with the stiff paper removed and ready to receive the end of a belt.

After lacer assembly 106 is positioned within the lacer attachment member 114 as shown in FIGS. 15 and 16, the user employs a knife (not shown) to cut paper 110 and reinforcing paper 112 so that both papers can be removed. After removal of the papers, hooks 108 remain in position within lacer attachment member 114 held in place by pin 128. The belt lacer assembly, with the papers removed as in FIGS. 17 and 18 is ready to receive a belt between the spaced apart pointed ends of the lacer assembly hooks.

FIGS. 13-18 show a tab 130 that is slidably affixed to jaw 120. The function of this tab will be described subsequently.

Figure 19:
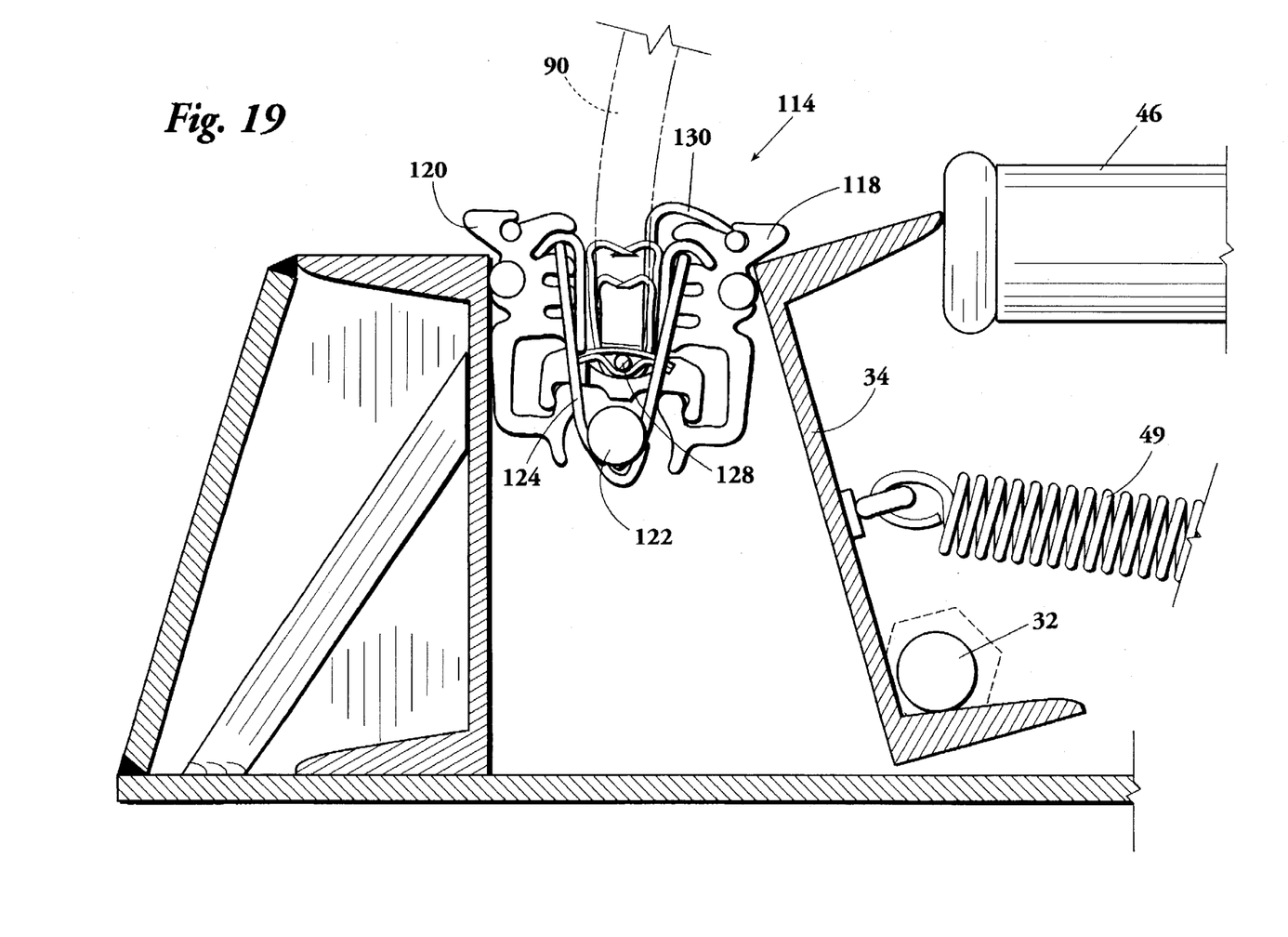
FIG. 19 is an enlarged elevational partial view of the apparatus showing the backup anvil and the moveable anvil with the lacer attachment member positioned therebetween and wherein the hooks of the lacer assembly has been forced to the closed position to clamp to penetrate a belt to thereby attach the lacer assembly to the belt.

Lacer attachment member 114 is positioned between backup anvil 22 and moveable anvil 34 as shown in FIG. 7 with lacer assembly 106 in position and the paper components removed. FIG. 19 shows belt 90 positioned between the jaws of the lacer attachment member 114 and the jack having been actuated to move extendable portion 46 to pivot moveable anvil 34 and thereby move jaws 118 and 120 towards each other. The jaws contact hooks 108 and cause the sharpened ends thereof to penetrate belt 90 on both sides so that the ends of the hooks overlap each other internally of the belt.

In theory, one actuation of jack 40 to moveable anvil 34 and move jaws 118 and 120 towards each other will simultaneously lock all the hooks in position. However, a superior job can be obtained by using tab 130. Tab 130 is of relatively narrow width compared to the length of lacer attachment member 114. The use of tab 130 permits the force applied by jack 40 to be concentrated on a relatively smaller number of hooks 108 at one time. In practice, tab 130 is positioned at one end of the lacer attachment and jack 40 is actuated to exert a high compressive force between jaws 118 and 120. Due to the thickness of tab 130 more compressive force is applied to the hooks which the tab engages. The jack is then released to cause the jaws to open slightly to allow the user to slide tab 130 to a different set of hooks. This sequence is repeated until all the hooks have been firmly embedded in belt 90.

After all of the hooks are secured to the end of a belt, pin 128 is removed so that belt 90 with the lacing attachment secured to it can be removed from between jaws 118 and 120, thus completing the installation of the lacer attachment on the squared end of the belt.

Figure 8:
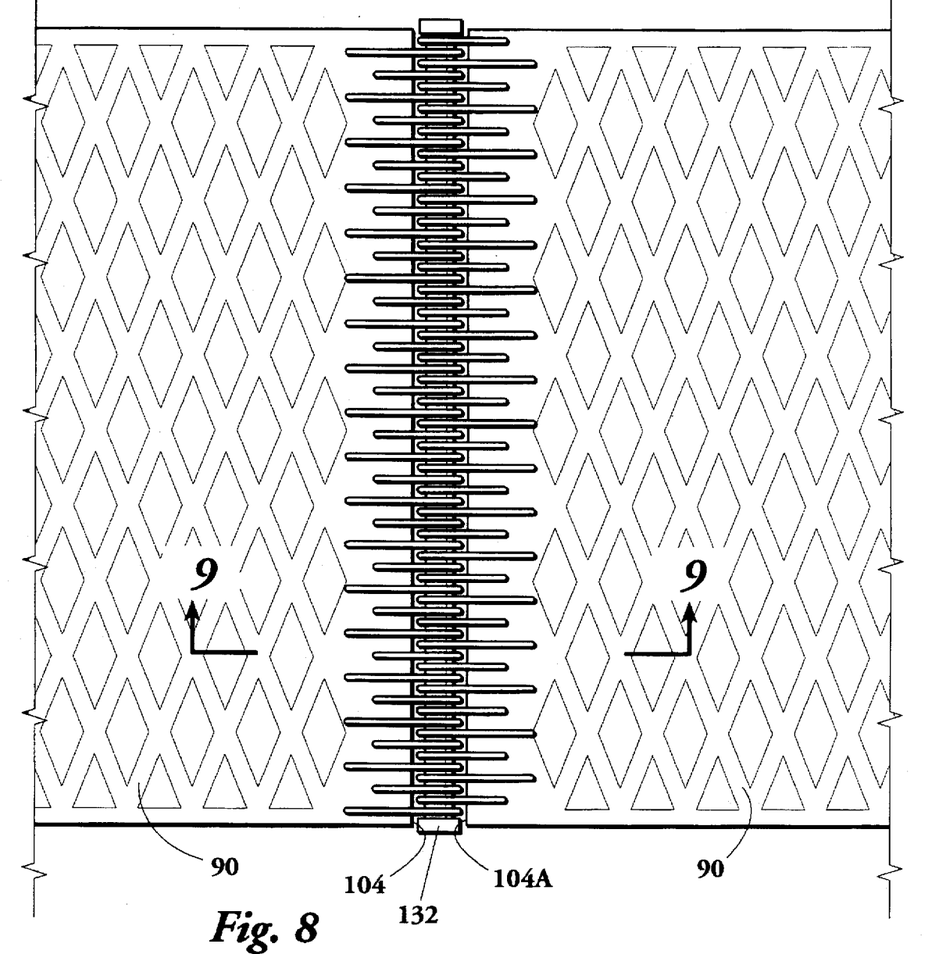
FIG. 8 is a plan view of the two end portions of a belt each having a lacer assembly attached to it and the two lacer assemblies secured pivotally to each other by a belt pin.
Figure 9:
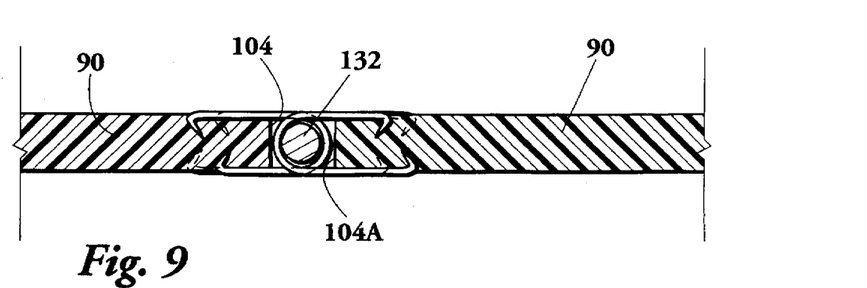
FIG. 9 is an elevational fragmentary cross-sectional view of the two end portions of a belt that have been spliced together to form a continuous loop belt, such as for use in a hay baler.

When a belt is used in a closed loop, which is the typical situation, for belts used on farm equipment and industrial equipment, a lacer assembly is attached to each end of the belt. FIGS. 8 and 9 show the opposite end portions of belt 90 secured end-to-end in an endless loop. More specifically, in FIGS. 8 and 9 the squared end 104 of belt 90 has a lacer assembly affixed to it and a lacer assembly is also affixed to the opposite squared end 104A. The belt can thus be formed in an endless loop by interlocking the belt lacer assemblies by use of a hinge pin 132.

The portable apparatus for affixing a lacer assembly to a belt as has been described herein has the advantage that it is relative lightweight so that it can be handled conveniently by one user. The apparatus can be easily transported in a pickup or in the trunk of an automobile so that it can be taken to a field in which hay baling or other farm activity is taking place. This permits a farmer or other machinery operator to repair on site a broken belt without having to take the belt to a shop for the repair service. All of the apparatus necessary to square the end of a damaged belt and to apply a lacer assembly to permit the belt to be put back in service is available on one relatively small, portable and convenient apparatus.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An apparatus for affixing a lacer assembly to an end of a belt, the lacer assembly being in the form of a plurality of paralleled metal lacing hooks each having a pin receiving portion, comprising:

a base;

a backup anvil supported on and extending upwardly from said base;

a moveable anvil pivotally supported on said base and spaced from said backup anvil providing an operating area therebetween;

a jack supported by said base, the jack having a body portion and an extendable portion, the jack being positioned to pivot said moveable anvil towards said backup anvil in response to activation thereof, the lacer assembly being positionable in said anvil operating area with an end of a belt positioned between lacing hooks of the lacer assembly;

means of actuation of said jack to force said moveable anvil toward said backup anvil to force said lacing hooks of said lacing assembly to penetrate and lock into said belt; and said base including means of positioning the end portion of the belt so that the length of the belt is perpendicular to a knife edge guide useful for trimming the belt prior to installation of a lacer assembly.

2. An apparatus for affixing a lacer assembly to an end of a belt according to claim 1 wherein said base has a horizontal upper surface having a cutting edge;

said means of positioning includes a first guide member secured to said base upper surface and said first guide member having a guide edge perpendicular to said cutting edge; and a second guide member secured to said base upper surface and having a guide edge spaced paralleled to said first guide member guide edge, the space between said guide edges being equal to the width of said belt whereby the length of a belt positioned between said guide edges is perpendicular to said cutting edge.

3. An apparatus for affixing a lacer assembly to an end of a belt according to claim 2 wherein said second guide member includes a horizontally extending lip spaced paralleled to and above said belt upper surface, said belt when in position between said first and second guides having one edge thereof beneath said horizontal lip; and a square having two legs extending at a right angle to each other, one leg of the square being positionable under said lip and in contact with said second guide member, the other leg of the square being positionable on said belt upper surface in alignment with said cutting edge, the square second leg serving as an upper knife guide edge positioned above said base cutting edge along which a knife blade may be moved to cut said belt.

4. An apparatus for affixing a lacer assembly to an end of a belt according to claim 1 wherein said base has a horizontal upper surface, including:

an abutment member affixed to an edge of said base and having an upper edge lying in a plane paralleled to and spaced above said base upper surface;

an elongated bar positioned on and spaced above said base upper surface; and means of securing said bar so that the space between the bar and said base upper surface is adjustable, the bar being spaced from and paralleled to said abutment member whereby a belt may be positioned on said base upper surface and underneath said bar with an end of the belt in contact with said abutment member and the belt clamped in position by said bar after which a portion of a surface of the belt may be removed with a knife blade guided by said abutment member upper edge.

5. An apparatus for affixing a lacer assembly to an end of a belt according to claim 1 including:

a lacer attachment member positioned between said backup anvil and moveable anvil, the lacer attachment member being formed of two opposed jaws hinged together whereby an upper edge of each jaw is pivotal towards the other in response to the pivotation of said moveable anvil, the lacer attachment member including means to accept a lacer assembly between said opposed jaws.

6. An apparatus for affixing a lacer assembly to an end of a belt according to claim 5 wherein said lacer attachment member includes means of receiving a removable elongated pin through said pin receiving portion of each of said lacing hooks making up said lacer assembly whereby said lacer assembly is retained within said jaws of said lacer attachment.

7. An apparatus for affixing a lacer assembly to an end of a belt according to claim 5 including a tab slidably supported on one of said lacer attachment member jaws, the tab being positionable to apply force to a selected few of said lacing hooks making up a lacer assembly as said jack is actuated.

8. An apparatus for affixing a lacer assembly to an end of a belt according to claim 1 wherein said jack extendable portion is moveable in a plane parallel to said base.

9. An apparatus for affixing a lacer assembly to an end of a belt according to claim 8 wherein said jack is hydraulically actuated.

10. An apparatus for affixing a lacer assembly to an end of a belt, the lacer assembly being in the form of a plurality of paralleled metal lacing hooks each having a pin receiving portion, comprising:

a base having a horizontal upper surface and a cutting edge;

a first guide member secured to said base upper surface and having a guide edge perpendicular to said cutting edge;

a second guide member secured to said base upper surface and having a guide edge spaced paralleled to said first guide member guide edge, the space between said guide edges being equal to the width of said belt whereby the length of a belt positioned between said guide edges is perpendicular to said cutting edge;

a backup anvil supported on and extending upwardly from said base;

a moveable anvil pivotally supported on said base and spaced from said backup anvil providing an operating area therebetween;

a jack supported by said base, the jack having a body portion and an extendable portion, the jack being positioned to pivot said moveable anvil towards said backup anvil in response to activation thereof, the lacer assembly being positionable in said anvil operating area with an end of a belt positioned between lacing hooks of the lacer assembly; and means of actuation of said jack to force said moveable anvil toward said backup anvil to force said lacing hooks of said lacing assembly to penetrate and lock into said belt.

11. An apparatus for affixed a lacer assembly to an end of a belt according to claim 10 wherein said base includes means of positioning the end portion of the belt so that the length of the belt is perpendicular to a knife edge guide useful for trimming the belt prior to installation of a lacer assembly.

12. An apparatus for affixing a lacer assembly to an end of a belt according to claim 10 wherein said second guide member includes a horizontally extending lip spaced paralleled to and above said belt upper surface, said belt when in position between said first and second guides having one edge thereof beneath said horizontal lip; and a square having two legs extending at a right angle to each other, one leg of the square being positionable under said lip and in contact with said second guide member, the other leg of the square being positionable on said belt upper surface in alignment with said cutting edge, the square second leg serving as an upper knife guide edge positioned above said base cutting edge along which a knife blade may be moved to cut said belt.

13. An apparatus for affixing a lacer assembly to an end of a belt according to claim 10 wherein said base has a horizontal upper surface, including:

an abutment member affixed to an edge of said base and having an upper edge lying in a plane paralleled to and spaced above said base upper surface;

an elongated bar positioned on and spaced above said base upper surface; and means of securing said bar so that the space between the bar and said base upper surface is adjustable, the bar being spaced from and paralleled to said abutment member whereby a belt may be positioned on said base upper surface and underneath said bar with an end of the belt in contact with said abutment member and the belt clamped in position by said bar after which a portion of a surface of the belt may be removed with a knife blade guided by said abutment member upper edge.

14. An apparatus for affixing a lacer assembly to an end of a belt according to claim 10 including:

a lacer attachment member positioned between said backup anvil and moveable anvil, the lacer attachment member being formed of two opposed jaws hinged together whereby an upper edge of each jaw is pivotal towards the other in response to the pivotation of said moveable anvil, the lacer attachment member including means to accept a lacer assembly between said opposed jaws.

15. An apparatus for affixing a lacer assembly to an end of a belt according to claim 14 wherein said lacer attachment member includes means of receiving a removable elongated pin through said pin receiving portion of each of said lacing hooks making up said lacer assembly whereby said lacer assembly is retained within said jaws of said lacer attachment.

16. An apparatus for affixing a lacer assembly to an end of a belt according to claim 14 including a tab slidably supported on one of said lacer attachment member jaws, the tab being positionable to apply force to a selected few of said lacing hooks making up a lacer assembly as said jack is actuated.

17. An apparatus for affixing a lacer assembly to an end of a belt according to claim 10 wherein said jack extendable portion is moveable in a plane parallel to said base.

18. An apparatus for affixing a lacer assembly to an end of a belt according to claim 17 wherein said jack is hydraulically actuated.

19. An apparatus for affixing a lacer assembly to an end of a belt, the lacer assembly being in the form of a plurality of paralleled metal lacing hooks each having a pin receiving portion, comprising:

a base having a horizontal upper surface;

an abutment member affixed to an edge of said base and having an upper edge lying in a plane paralleled to and spaced above said base upper surface;

an elongated bar positioned on and spaced above said base upper surface;

means of securing said bar so that the space between the bar and said base upper surface is adjustable, the bar being spaced from and paralleled to said abutment member whereby a belt may be positioned on said base upper surface and underneath said bar with an end of the belt in contact with said abutment member and the belt clamped in position by said bar after which a portion of a surface of the belt may be removed with a knife blade guided by said abutment member upper edge;

a backup anvil supported on and extending upwardly from said base;

a moveable anvil pivotally supported on said base and spaced from said backup anvil providing an operating area therebetween;

a jack supported by said base, the jack having a body portion and an extendable portion, the jack being positioned to pivot said moveable anvil towards said backup anvil in response to activation thereof, the lacer assembly being positionable in said anvil operating area with an end of a belt positioned between lacing hooks of the lacer assembly; and means of actuation of said jack to force said moveable anvil toward said backup anvil to force said lacing hooks of said lacing assembly to penetrate and lock into said belt.

20. An apparatus for affixed a lacer assembly to an end of a belt according to claim 19 wherein said base includes means of positioning the end portion of the belt so that the length of the belt is perpendicular to a knife edge guide useful for trimming the belt prior to installation of a lacer assembly.

21. An apparatus for affixing a lacer assembly to an end of a belt according to claim 19 wherein said base has a horizontal upper surface having a cutting edge;

a first guide member secured to said base upper surface and having a guide edge perpendicular to said cutting edge; and a second guide member secured to said base upper surface and having a guide edge spaced paralleled to said first guide member guide edge, the space between said guide edges being equal to the width of said belt whereby the length of a belt positioned between said guide edges is perpendicular to said cutting edge.

22. An apparatus for affixing a lacer assembly to an end of a belt according to claim 21 wherein said second guide member includes a horizontally extending lip spaced paralleled to and above said belt upper surface, said belt when in position between said first and second guides having one edge thereof beneath said horizontal lip; and a square having two legs extending at a right angle to each other, one leg of the square being positionable under said lip and in contact with said second guide member, the other leg of the square being positionable on said belt upper surface in alignment with said cutting edge, the square second leg serving as an upper knife guide edge positioned above said base cutting edge along which a knife blade may be moved to cut said belt.

23. An apparatus for affixing a lacer assembly to an end of a belt according to claim 19 including:

a lacer attachment member positioned between said backup anvil and moveable anvil, the lacer attachment member being formed of two opposed jaws hinged together whereby an upper edge of each jaw is pivotal towards the other in response to the pivotation of said moveable anvil, the lacer attachment member including means to accept a lacer assembly between said opposed jaws.

24. An apparatus for affixing a lacer assembly to an end of a belt according to claim 23 wherein said lacer attachment member includes means of receiving a removable elongated pin through said pin receiving portion of each of said lacing hooks making up said lacer assembly whereby said lacer assembly is retained within said jaws of said lacer attachment.

25. An apparatus for affixing a lacer assembly to an end of a belt according to claim 23 including a tab slidably supported on one of said lacer attachment member jaws, the tab being positionable to apply force to a selected few of said lacing hooks making up a lacer assembly as said jack is actuated.

26. An apparatus for affixing a lacer assembly to an end of a belt according to claim 19 wherein said jack extendable portion is moveable in a plane parallel to said base.

27. An apparatus for affixing a lacer assembly to an end of a belt according to claim 26 wherein said jack is hydraulically actuated.

28. An apparatus for affixing a lacer assembly to an end of a belt, the lacer assembly being in the form of a plurality of paralleled metal lacing hooks each having a pin receiving portion, comprising:

a base;

a backup anvil supported on and extending upwardly from said base;

a moveable anvil pivotally supported on said base and spaced from said backup anvil providing an operating area therebetween;

a jack supported by said base, the jack having a body portion and an extendable portion, the jack being positioned to pivot said moveable anvil towards said backup anvil in response to activation thereof, the lacer assembly being position able in said anvil operating area with an end of a belt positioned between lacing hooks of the lacer assembly, said jack extendable portion being moveable in a plane parallel to said base; and means of actuation of said jack to force said moveable anvil toward said backup anvil to force said lacing hooks of said lacing assembly to penetrate and lock into said belt.

29. An apparatus for affixed a lacer assembly to an end of a belt according to claim 28 wherein said base includes means of positioning the end portion of the belt so that the length of the belt is perpendicular to a knife edge guide useful for trimming the belt prior to installation of a lacer assembly.

30. An apparatus for affixing a lacer assembly to an end of a belt according to claim 28 wherein said base has a horizontal upper surface having a cutting edge;

a first guide member secured to said base upper surface and having a guide edge perpendicular to said cutting edge; and a second guide member secured to said base upper surface and having a guide edge spaced paralleled to said first guide member guide edge, the space between said guide edges being equal to the width of said belt whereby the length of a belt positioned between said guide edges is perpendicular to said cutting edge.

31. An apparatus for affixing a lacer assembly to an end of a belt according to claim 30 wherein said second guide member includes a horizontally extending lip spaced paralleled to and above said belt upper surface, said belt when in position between said first and second guides having one edge thereof beneath said horizontal lip; and a square having two legs extending at a right angle to each other, one leg of the square being positionable under said lip and in contact with said second guide member, the other leg of the square being positionable on said belt upper surface in alignment with said cutting edge, the square second leg serving as an upper knife guide edge positioned above said base cutting edge along which a knife blade may be moved to cut said belt.

32. An apparatus for affixing a lacer assembly to an end of a belt according to claim 28 wherein said base has a horizontal upper surface, including:

an abutment member affixed to an edge of said base and having an upper edge lying in a plane paralleled to and spaced above said base upper surface;

an elongated bar positioned on and spaced above said base upper surface; and means of securing said bar so that the space between the bar and said base upper surface is adjustable, the bar being spaced from and paralleled to said abutment member whereby a belt may be positioned on said base upper surface and underneath said bar with an end of the belt in contact with said abutment member and the belt clamped in position by said bar after which a portion of a surface of the belt may be removed with a knife blade guided by said abutment member upper edge.

33. An apparatus for affixing a lacer assembly to an end of a belt according to claim 28 including:

a lacer attachment member positioned between said backup anvil and moveable anvil, the lacer attachment member being formed of two opposed jaws hinged together whereby an upper edge of each jaw is pivotal towards the other in response to the pivotation of said moveable anvil, the lacer attachment member including means to accept a lacer assembly between said opposed jaws.

34. An apparatus for affixing a lacer assembly to an end of a belt according to claim 33 wherein said lacer attachment member includes means of receiving a removable elongated pin through said pin receiving portion of each of said lacing hooks making up said lacer assembly whereby said lacer assembly is retained within said jaws of said lacer attachment.

35. An apparatus for affixing a lacer assembly to an end of a belt according to claim 33 including a tab slidably supported on one of said lacer attachment member jaws, the tab being positionable to apply force to a selected few of said lacing hooks making up a lacer assembly as said jack is actuated.

36. An apparatus for affixing a lacer assembly to an end of a belt according to claim 28 wherein said jack is hydraulically actuated.

* * * * *